(12) United States Patent
Mitsumori et al.

(10) Patent No.: US 12,108,142 B2
(45) Date of Patent: Oct. 1, 2024

(54) INFORMATION PROCESSING METHOD AND ELECTRONIC DEVICE

(71) Applicant: SONY GROUP CORPORATION, Tokyo (JP)

(72) Inventors: Ryo Mitsumori, Tokyo (JP); Sho Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 102 days.

(21) Appl. No.: 17/904,120

(22) PCT Filed: Feb. 21, 2020

(86) PCT No.: PCT/JP2020/007253
§ 371 (c)(1),
(2) Date: Aug. 12, 2022

(87) PCT Pub. No.: WO2021/166264
PCT Pub. Date: Aug. 26, 2021

(65) Prior Publication Data
US 2023/0076700 A1 Mar. 9, 2023

(51) Int. Cl.
*H04N 23/62* (2023.01)
*G06F 3/0482* (2013.01)
(Continued)

(52) U.S. Cl.
CPC ........... *H04N 23/62* (2023.01); *G06F 3/0482* (2013.01); *G06F 3/04883* (2013.01);
(Continued)

(58) Field of Classification Search
CPC ......... G06F 1/1686; G06F 2203/04803; G06F 3/0482; G06F 3/04847; G06F 3/04883;
(Continued)

(56) References Cited

U.S. PATENT DOCUMENTS 9,716,825 B1 * 7/2017 Manzari ............... H04N 23/695
10,542,205 B2 1/2020 Stricker
(Continued)

FOREIGN PATENT DOCUMENTS

CN 110072070 A 7/2019
CN 110248081 A 9/2019
(Continued)

OTHER PUBLICATIONS

International Search Report and Written Opinion of PCT Application No. PCT/JP2020/007253, issued on Apr. 21, 2020, 11 pages of ISRWO.

*Primary Examiner* — Amy R Hsu
(74) *Attorney, Agent, or Firm* — CHIP LAW GROUP

(57) ABSTRACT

Provided is an electronic device including a plurality of built-in camera lenses having different focal lengths. The electronic device executes processing of displaying a photographing mode selection screen, a lens selection screen, and an exposure control parameter setting screen. The photographing mode selection screen is a screen to select a photographing mode. The lens selection screen is a screen to select a photographing camera lens to be used for photographing from the plurality of camera lenses. The exposure control parameter setting screen is a screen to set an exposure control parameter.

20 Claims, 14 Drawing Sheets

(51) Int. Cl.
  *G06F 3/04883* (2022.01)
  *H04N 23/667* (2023.01)
  *H04N 23/69* (2023.01)
  *H04N 23/73* (2023.01)

(52) U.S. Cl.
  CPC .......... *H04N 23/667* (2023.01); *H04N 23/69* (2023.01); *H04N 23/73* (2023.01)

(58) Field of Classification Search
  CPC .... H04N 23/62; H04N 23/632; H04N 23/633; H04N 23/667; H04N 23/69; H04N 23/73
  See application file for complete search history.

(56) References Cited

U.S. PATENT DOCUMENTS

2008/0218612 A1* 9/2008 Border ................. G03B 13/36
                                                    348/262
2017/0359506 A1  12/2017 Manzari
2018/0109722 A1*  4/2018 Laroia ................. H04N 23/45
2018/0288310 A1* 10/2018 Goldenberg ......... H04N 23/635
2019/0028650 A1   1/2019 Bernstein
2019/0174055 A1*  6/2019 Srivastava ............ H04N 23/62
2022/0159183 A1   5/2022 Li

FOREIGN PATENT DOCUMENTS

| | | |
|---|---|---|
| JP | 2008-147853 A | 6/2008 |
| JP | 2009-171233 A | 7/2009 |
| JP | 2013-534121 A | 8/2013 |
| JP | 2014-038195 A | 2/2014 |
| JP | 2017-017376 A | 1/2017 |
| JP | 2017-111629 A | 6/2017 |
| JP | 2017-228897 A | 12/2017 |
| JP | 2018-107707 A | 7/2018 |
| JP | 2019-075810 A | 5/2019 |
| WO | 2014/148621 A1 | 9/2014 |

* cited by examiner

INFORMATION PROCESSING METHOD AND ELECTRONIC DEVICE

CROSS REFERENCE TO RELATED APPLICATIONS

This application is a U.S. National Phase of International Patent Application No. PCT/JP2020/007253 filed on Feb. 21, 2020. Each of the above-referenced applications is hereby incorporated herein by reference in its entirety.

FIELD

The present invention relates to a program, an information processing method, and an electronic device.

BACKGROUND

A camera function of a smartphone is rapidly spreading to general users because anyone can easily capture an image. In many cases, photographing is completed only by operation of a shutter button, and a user hardly recognizes parameters related to image quality such as exposure.

CITATION LIST

Patent Literature

Patent Literature 1: JP 2019-075810 A

SUMMARY

Technical Problem

The camera function of the conventional smartphone is designed so that even a user who is not familiar with a camera can easily perform photographing with a simple operation. Therefore, a range in which the user can be involved in the image quality is narrow, and it is difficult to sufficiently satisfy a user who is familiar with the camera. This problem similarly occurs in an electronic device (for example, a tablet terminal, a notebook personal computer, a mobile phone other than a smartphone, and the like) other than the smartphone.

Therefore, the present disclosure proposes a photographing program, an information processing method, and an electronic device capable of expanding a range in which a user can be involved in image quality.

Solution to Problem

According to the present disclosure, a program for causing an electronic device including a plurality of built-in camera lenses having different focal lengths is provided that executes processing of displaying a photographing mode selection screen to select a photographing mode, a lens selection screen to select a photographing camera lens to be used for photographing from the plurality of camera lenses, and an exposure control parameter setting screen to set an exposure control parameter.

DESCRIPTION OF EMBODIMENTS

Hereinafter, embodiments of the present disclosure will be described in detail with reference to the drawings. In each of the following embodiments, the same parts are denoted by the same reference signs, and redundant description will be omitted.

Note that the description will be given in the following order.
[1. First Embodiment]
[1-1. Configuration of Smartphone]
[1-2. User Interface of Camera Application]
[1-3. Information Processing Method]
[1-4. Effects]
[1-5. Modification Example]
[2. Second Embodiment]
[2-1. User Interface of Camera Application]
[2-2. Effects]

1. First Embodiment

1-1. Configuration of Smartphone

Figure 1:
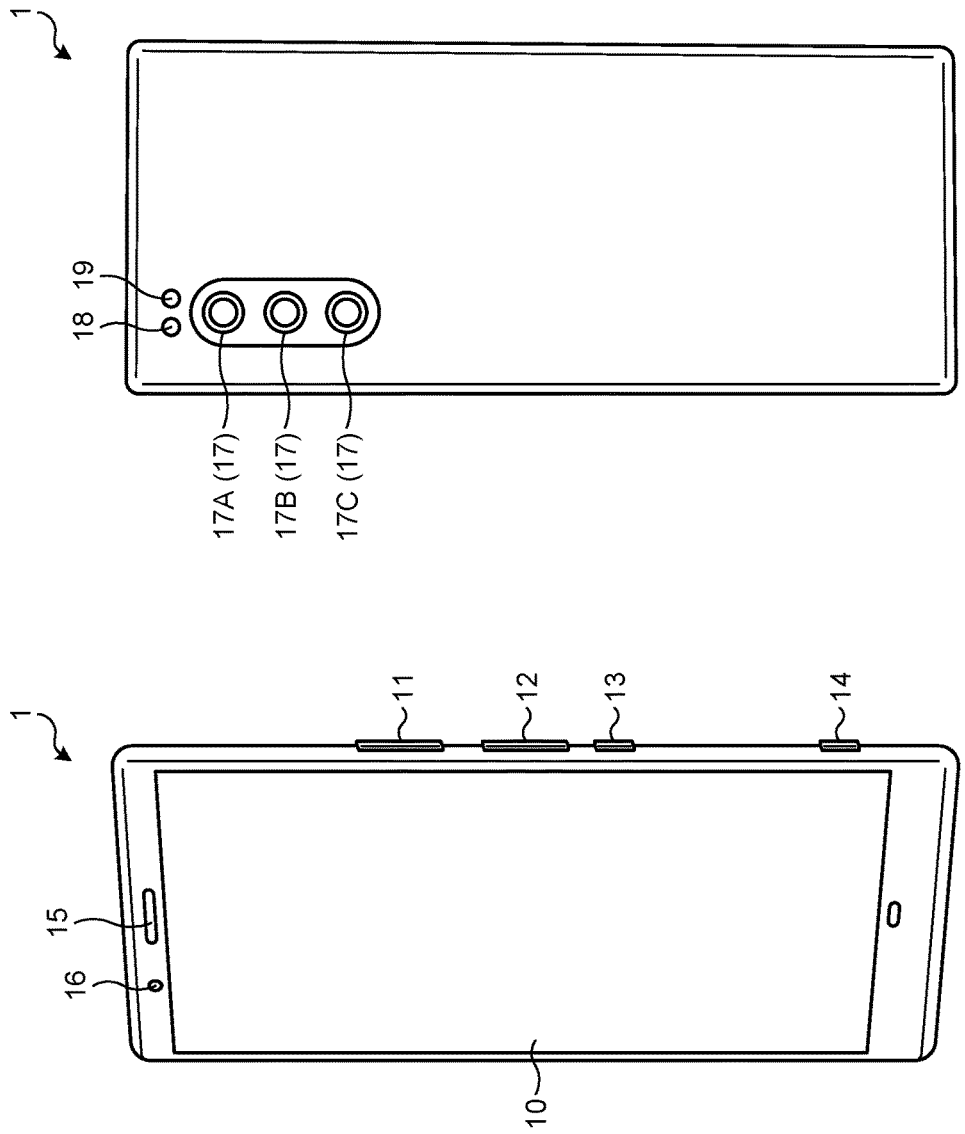
FIG. 1 is a schematic diagram of a smartphone according to a first embodiment.

FIG. 1 is a schematic diagram of a smartphone 1 according to a first embodiment. A left side of FIG. 1 illustrates a configuration on a front surface side of the smartphone 1. A right side of FIG. 1 illustrates a configuration on a back surface side of the smartphone 1.

The smartphone 1 is a portable electronic device having a camera function. A touch screen 10 is provided on a front surface of the smartphone 1. The touch screen 10 is a device in which a touch panel and a display are integrated. The touch screen 10 detects a user's touch operation. As a detection method of the touch screen 10, known methods such as a capacitance method, a resistive film method, a surface acoustic wave method (or an ultrasonic method), an infrared method, an electromagnetic induction method, and a load detection method are used.

The touch screen 10 has a rectangular shape. At one end portion in a longitudinal direction of the smartphone 1, for example, a camera lens 16 for a front camera and an earpiece 15 are provided. The earpiece 15 is provided with a speaker. Although not illustrated, the other end portion of the smartphone 1 is provided with, for example, a mouthpiece having a microphone.

On a side surface of the smartphone 1 along a long side of the touch screen 10, for example, a volume key 11, a fingerprint sensor 12, a power key 13, and a camera key 14 are provided. The volume key 11 is a hardware key that performs volume adjustment. The fingerprint sensor 12 is a device that reads a fingerprint. The power key 13 is a hardware key that turns on/off power. The camera key 14 is a hardware key for activating a camera application. The camera key 14 is used as a shutter at the time of photographing. The camera key 14 is provided, for example, at a position closer to the mouthpiece (opposite to a side of the earpiece 15) than a central portion of the side surface of the smartphone 1.

A plurality of camera lenses 17 having different focal lengths are provided on a back surface of the smartphone 1. Each of the camera lenses 17 is a camera lens for an out-camera. In the example of FIG. 1, as the plurality of camera lenses 17, for example, a first camera lens 17A, a second camera lens 17B, and a third camera lens 17C are provided. The first camera lens 17A is, for example, a wide-angle lens having an F value (diaphragm value) of 2.8 and a focal length of 16 mm. The second camera lens 17B is, for example, a standard lens having an F value of 2.8 and a focal length of 24 mm. The third camera lens 17C is, for example, a telephoto lens having an F value of 2.8 and a focal length of 70 mm.

A flash light 18 and a red green blue clear-infrared (an RGBC-IR) sensor 19 are provided in the vicinity of the camera lenses 17. The flash light 18 is a device that is turned on at the time of photographing to brightly illuminate a photographing target. The RGBC-IR sensor 19 is a device that detects a component of a light source in a photographing environment at the time of photographing. The RGBC-IR sensor 19 acquires, for example, infrared information around the smartphone 1, and specifies a light source environment such as outdoor, an incandescent lamp, or a fluorescent lamp.

Figure 2:
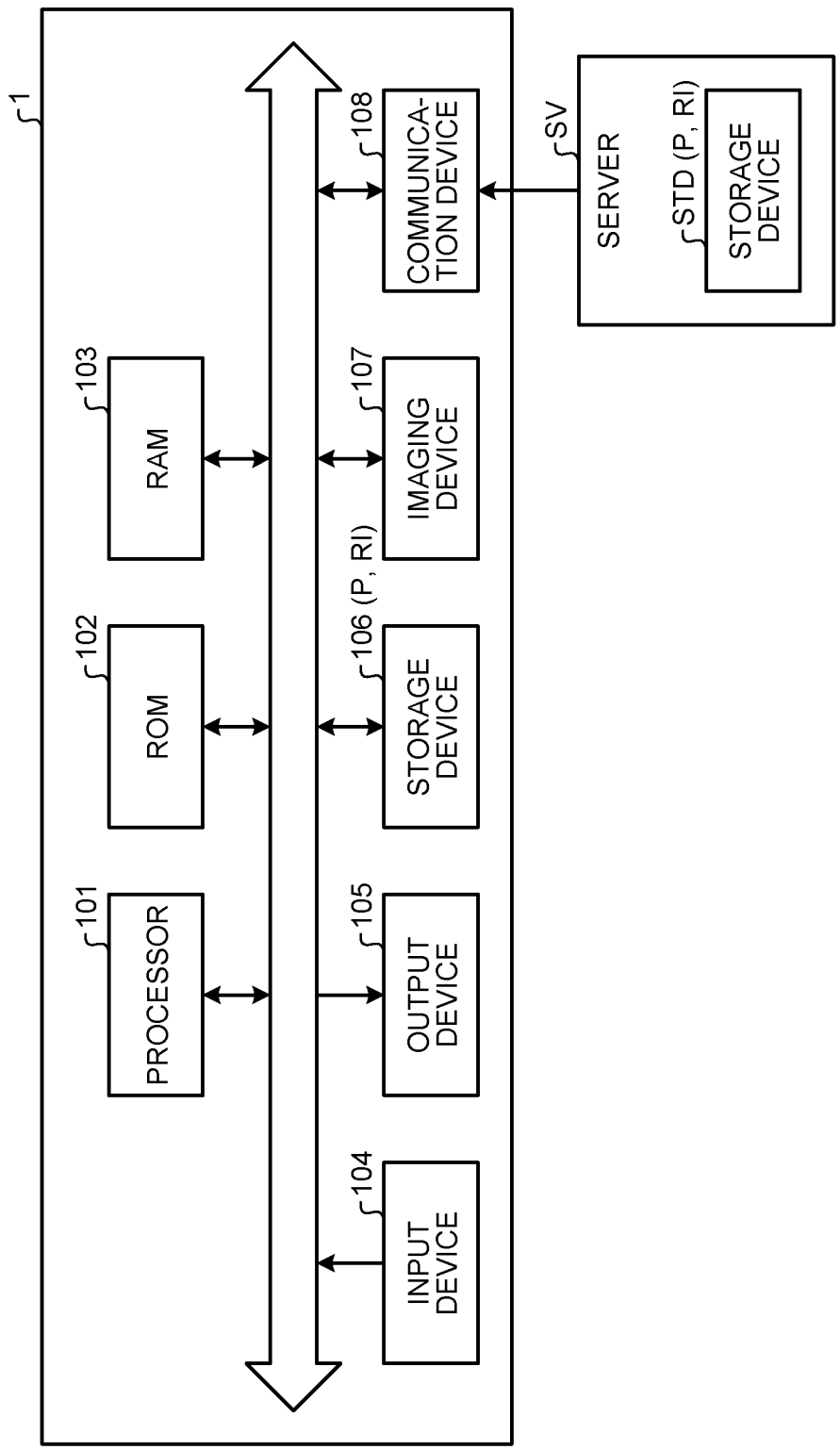
FIG. 2 is an explanatory diagram illustrating an example of a hardware configuration of the smartphone.

FIG. 2 is an explanatory diagram illustrating an example of a hardware configuration of the smartphone 1.

The smartphone 1 includes, for example, a processor 101, a read only memory (ROM) 102, a random access memory (RAM) 103, an input device 104, an output device 105, a storage device 106, an imaging device 107, and a communication device 108.

The processor 101 controls an operation of the smartphone 1. The processor 101 includes, for example, a central processing unit (CPU), a system-on-a-chip (SoC), a micro control unit (MCU), and a field-programmable gate array (FPGA).

The processor 101 realizes various functions of the smartphone 1 by executing various programs stored in the storage device 106. The processor 101 executes various controls by executing instructions included in the programs while referring to data input from the input device 104 and a result of arithmetic processing. Hereinafter, processing executed by the processor 101 according to the programs will be described as processing executed by the smartphone 1.

The RAM 103 temporarily stores programs used in the execution of the processor 101, parameters that appropriately change in the execution of the processor 101, and the like. The processor 101, the ROM 102, and the RAM 103 are mutually connected by a host bus.

The input device 104 includes, for example, the touch screen 10, the volume key 11, the fingerprint sensor 12, the power key 13, the camera key 14, the microphone, and then RGBC-IR sensor 19. The input of data to the smartphone 1 and the instruction of a processing operation are performed using the input device 104. The output device 105 includes, for example, the touch screen 10, the speaker, and the flash light 18. The touch screen 10 serves as both the input device 104 and the output device 105.

The storage device 106 stores various programs and data executed by the processor 101. The storage device 106 is also used as, for example, a work area for temporarily storing a processing result of the processor 101. The storage device 106 is, for example, a semiconductor memory such as a flash memory. The programs stored in the storage device 106 include a program P that implements a function of the camera application. The data stored in the storage device 106 includes reference information RI referred to by the program P.

The imaging device 107 includes, for example, an in-camera and the out-camera. Photographing with the out-camera is performed using the plurality of camera lenses 17 having different focal lengths. A user selects one of the camera lenses 17, which has a desired focal length according to a photographing condition, to perform photographing.

The communication device 108 wirelessly communicates with an external device. Known wireless communication standards such as long term evolution (LTE), Wifi (registered trademark), and Bluetooth (registered trademark) are adopted.

The program P and the reference information RI are installed in the storage device 106 via wireless communication by the communication device 108, for example. The user downloads the program P and the reference information RI from a server SV. The server SV includes, for example, a storage device STD that stores the program P and the reference information RI. The storage device STD includes, for example, a non-transitory storage medium such as a semiconductor storage medium and a magnetic storage medium.

1-2. User Interface of Camera Application

Figure 3:
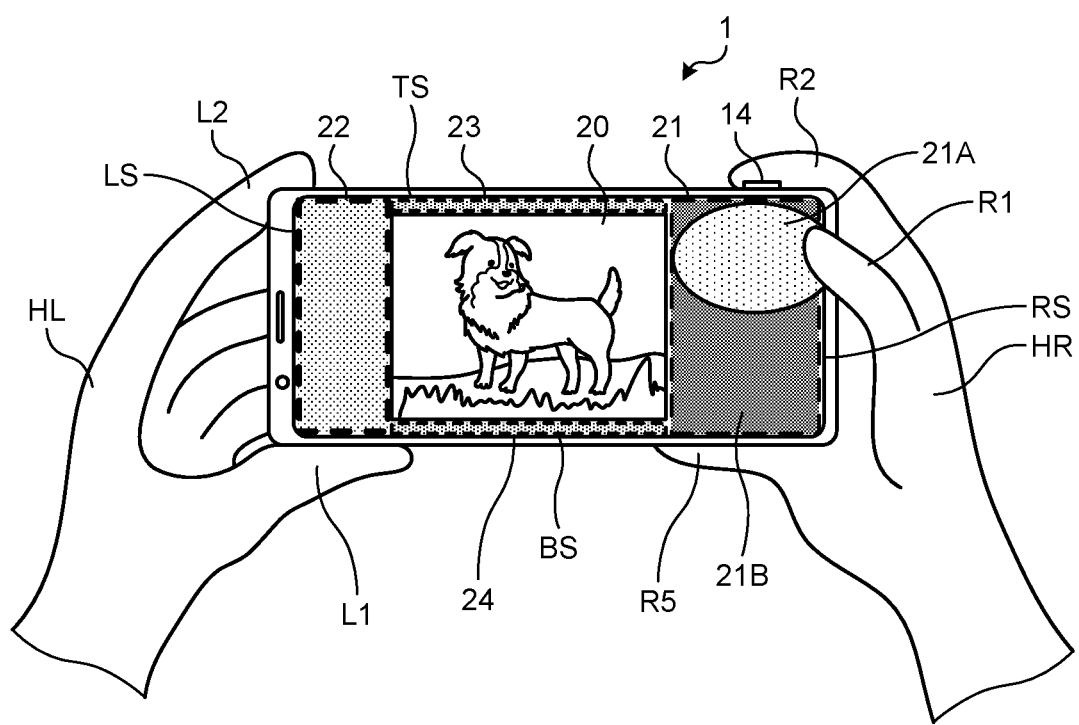
FIG. 3 is a diagram illustrating an example of a screen of a camera application.

FIG. 3 is a diagram illustrating an example of a screen of the camera application.

The screen of the camera application is a horizontal screen with the camera key 14 at the top. For example, a monitor screen 20 is displayed at a center of the touch screen 10. The user faces the camera lens 17 toward a subject and checks the subject on the monitor screen 20. The user holds an end of the smartphone 1 on a side of the earpiece 15 with a left hand HL, and holds an end of the mouthpiece with a right hand HR. The user performs a touch operation on the touch screen 10 with a thumb R1 of the right hand HR while pressing the camera key 14 with an index finger R2 of the right hand HR.

For example, a first operation area 21, a second operation area 22, and a footer area 24 are provided around the monitor screen 20. An upper end portion of the monitor screen 20 is a header area 23. The camera key 14 that performs a shutter operation is disposed at the top of the monitor screen 20. For example, when one side of the touch screen 10 facing the camera key 14 is an upper side TS, the first operation area 21 is an operation area along a right side RS of the touch screen 10. The second operation area 22 is an operation area along a left side LS of the touch screen 10. The header area 23 is an information display area along the upper side TS of the touch screen 10. The footer area 24 is an information display area along a lower side BS of the touch screen 10.

At the time of photographing, it is expected that the shutter operation is performed with the index finger R2 in conjunction with the movement of the thumb R1. Therefore, in the first operation area 21 which is an operation range of the thumb R1, for example, a function (exposure setting or the like) requiring immediacy is arranged. In the second operation area 22, for example, although immediacy is not required, frequently accessed functions (such as setting of a photographing mode and selection of the camera lens 17) are arranged. In the header area 23, for example, information corresponding to the situation is displayed. In the footer area 24, for example, information regarding focus setting and exposure setting is displayed.

FIGS. 4 to 20 are diagrams illustrating an example of a user interface of the camera application.

Figure 4:
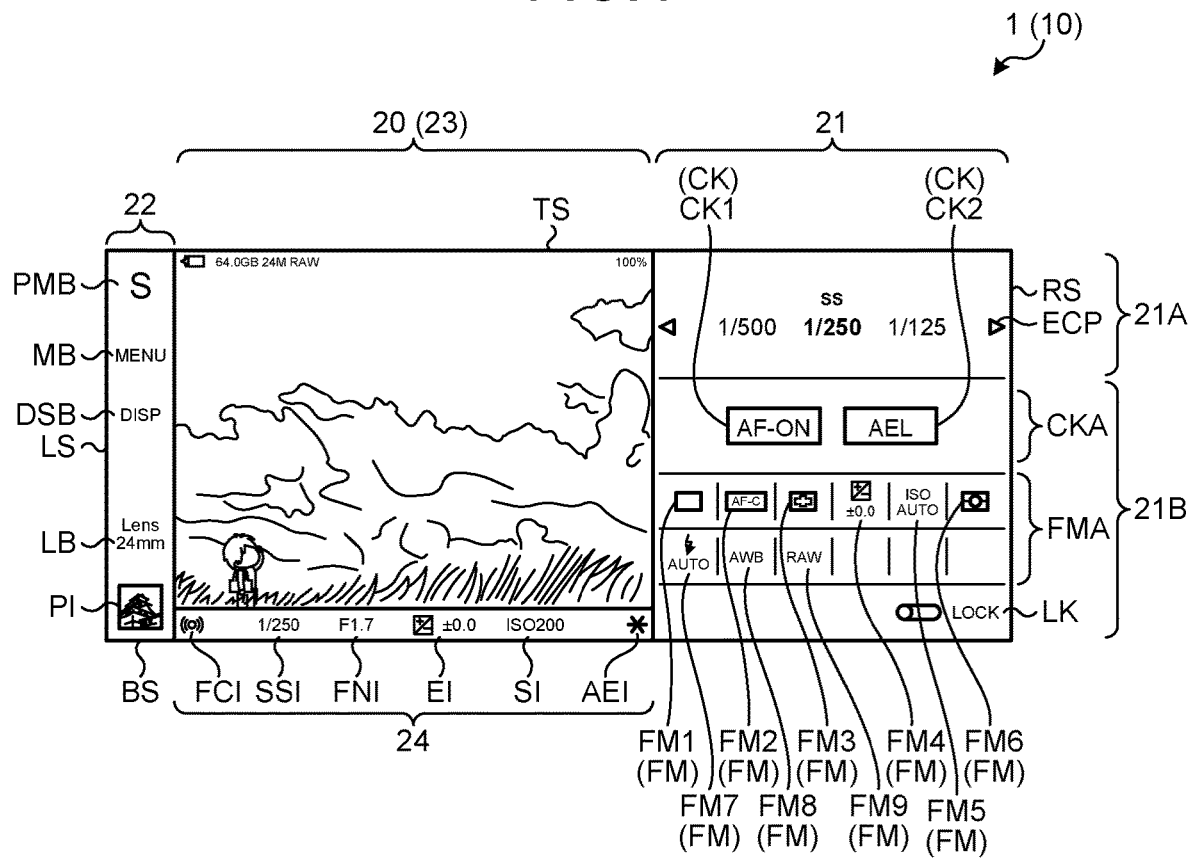
FIG. 4 is a diagram illustrating an example of a user interface of the camera application.

As illustrated in FIG. 4, the first operation area 21 is divided into, for example, an upper area 21A and a lower area 21B. The upper area 21A is an area facing the upper side TS in the first operation area 21. The lower area 21B is an area facing the lower side BS in the first operation area 21.

For example, an exposure control parameter setting screen ECP is displayed in the upper area 21A. The exposure control parameter setting screen ECP is a screen to set an exposure control parameter for controlling exposure. On the exposure control parameter setting screen ECP, a plurality of exposure control parameters including a shutter speed (SS), an ISO sensitivity (S), and an exposure value (EV) can be set.

The lower area 21B includes, for example, a custom key display area CKA and a function menu display area FMA. In the lower area 21B, for example, a lock key LK is displayed below the function menu display area FMA. The lock key LK is, for example, a software key that disables a touch operation on the function menu display area FMA.

One or more custom keys CK are displayed in the custom key display area CKA. In FIG. 4, for example, a first custom key CK1 and a second custom key CK2 are displayed as the one or more custom keys CK. The first custom key CK1 is, for example, a software key that enables autofocus (AF). The second custom key CK2 is, for example, a software key that enables an auto exposure (AE) lock (a mode for photographing with exposure fixed).

In the function menu display area FMA, one or more function menus FM are displayed. In FIG. 4, for example, a first function menu FM1 to a ninth function menu FM9 are displayed as the one or more function menus FM. The first function menu FM1 is, for example, a software key for setting a drive mode. The second function menu FM2 is, for example, a software key for setting a focus mode. The third function menu FM3 is, for example, a software key for setting a focus area. The fourth function menu FM4 is, for example, a software key that performs exposure correction. The fifth function menu FM5 is, for example, a software key for setting an ISO sensitivity. The sixth function menu FM6 is, for example, a software key for setting a photometry mode. The seventh function menu FM7 is, for example, a software key for setting a flash mode. The eighth function menu FM8 is, for example, a software key for setting white balance. The ninth function menu FM9 is, for example, a software key for setting a file format.

FIGS. 8 to 11 are diagrams illustrating an example of a white balance adjustment method.

In response to detection of a touch operation on the eighth function menu FM8, the smartphone 1 displays a white balance menu screen WBS. The white balance menu screen WBS is displayed, for example, in the first operation area 21.

Figure 8:
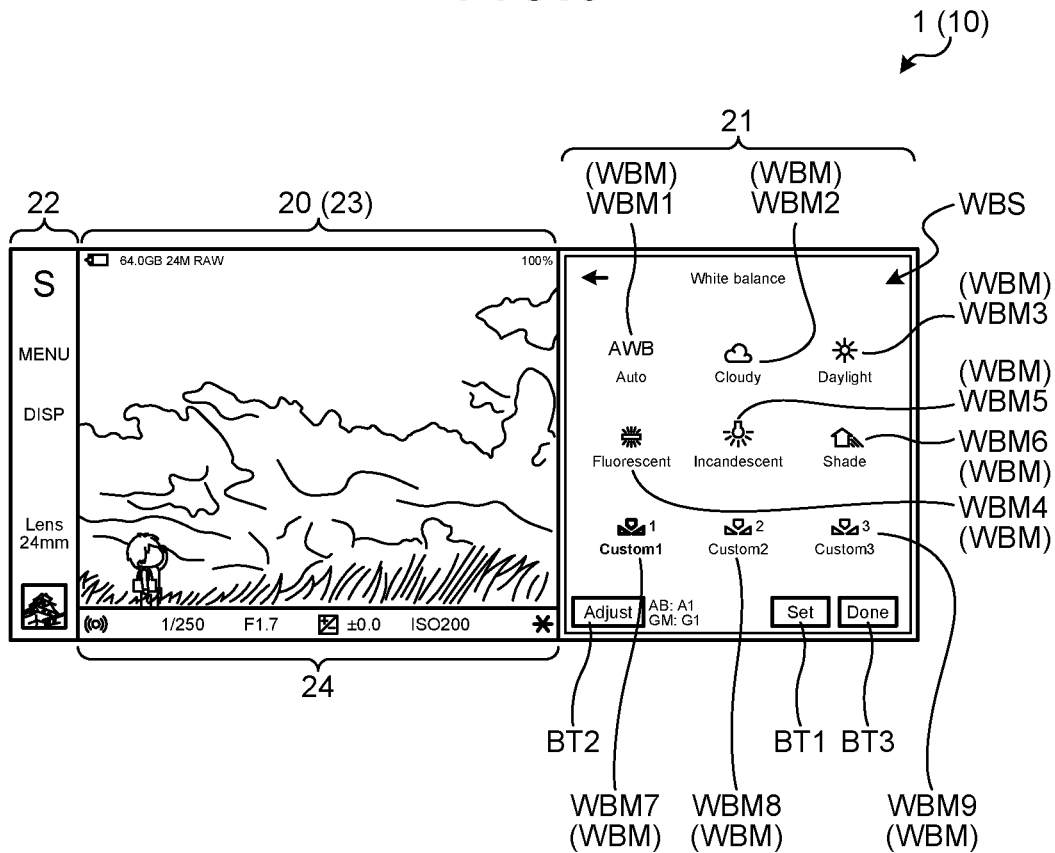
FIG. 8 is a diagram illustrating an example of the user interface of the camera application.

On the white balance menu screen WBS, for example, a plurality of white balance keys WBM indicating white balance base are displayed. In FIG. 8, for example, a first white balance key WBM1 to a ninth white balance key WBM9 are displayed as the plurality of white balance keys WBM. A setting key BT1, an adjustment key BT2, and a completion key BT3 are displayed below the plurality of white balance keys WBM.

The first white balance key WBM1 is, for example, a software key indicating automatic white balance. The automatic white balance is a mode in which an illumination environment serving as the white balance base is automatically determined using the RGBC-IR sensor 19.

The second white balance key WBM2 to the sixth white balance key WBM6 are, for example, software keys indicating preset white balance. The preset white balance is a mode in which the user sets an illumination environment serving as the white balance base. For example, the second white balance key WBM2 is a software key that adjusts white balance suitable for cloudy weather. The third white balance key WBM3 is, for example, a software key that adjusts white balance suitable for daytime outdoor photographing. The fourth white balance key WBM4 is, for example, a software key that adjusts white balance suitable for photographing in an illumination environment by a fluorescent lamp. The fifth white balance key WBM5 is, for example, a software key that adjusts white balance suitable for photographing in an illumination environment by an incandescent lamp. The sixth white balance key WBM6 is, for example, a software key that adjusts white balance suitable for photographing in the shade.

The seventh white balance key WBM7 to the ninth white balance key WBM9 are, for example, software keys indicating custom white balance. The custom white balance is a mode in which the user sets white as a reference of the white balance.

Figure 9:
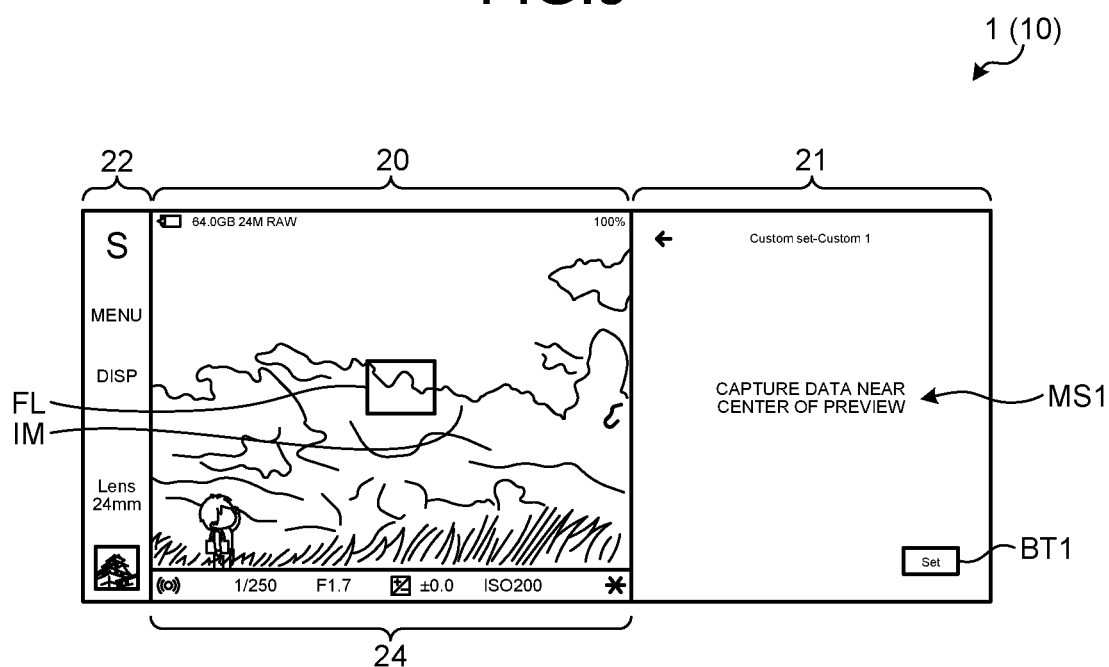
FIG. 9 is a diagram illustrating an example of the user interface of the camera application.

As illustrated in FIG. 9, when the seventh white balance key WBM7 to the ninth white balance key WBM9 are selected, a capturing frame FL is displayed on the monitor screen 20. The user holds the smartphone 1 such that a part of an image IM as a reference of white falls within the capturing frame FL. When the user performs a touch operation on the setting key BT1 in this state, a message MS1 is displayed in the first operation area 21, and data of the image IM in the capturing frame FL is captured in the storage device 106.

Figure 10:
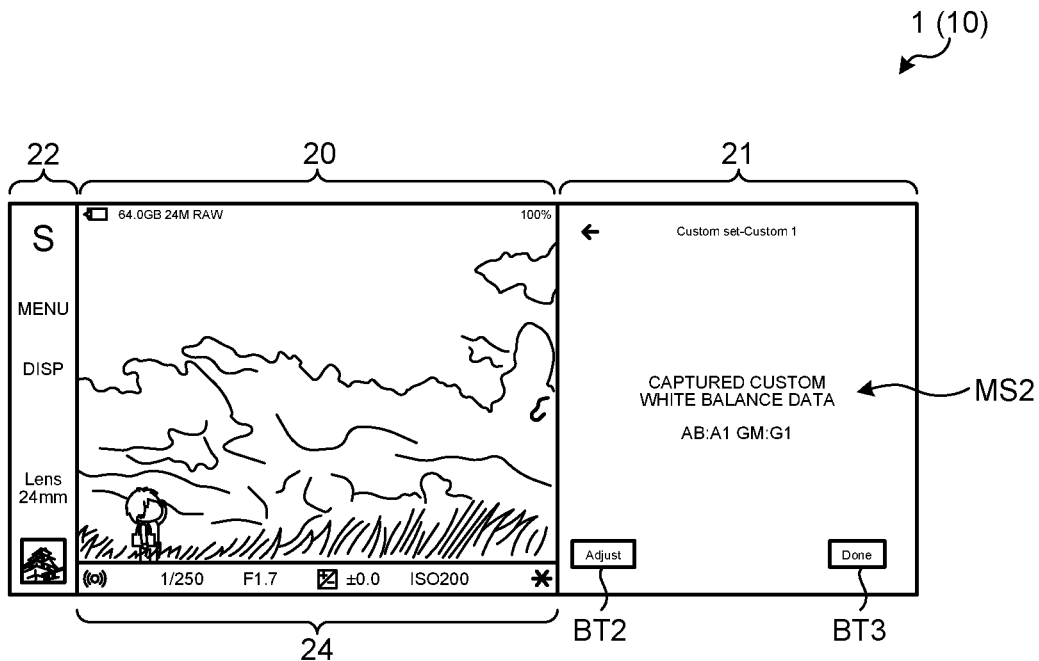
FIG. 10 is a diagram illustrating an example of the user interface of the camera application.
Figure 11:
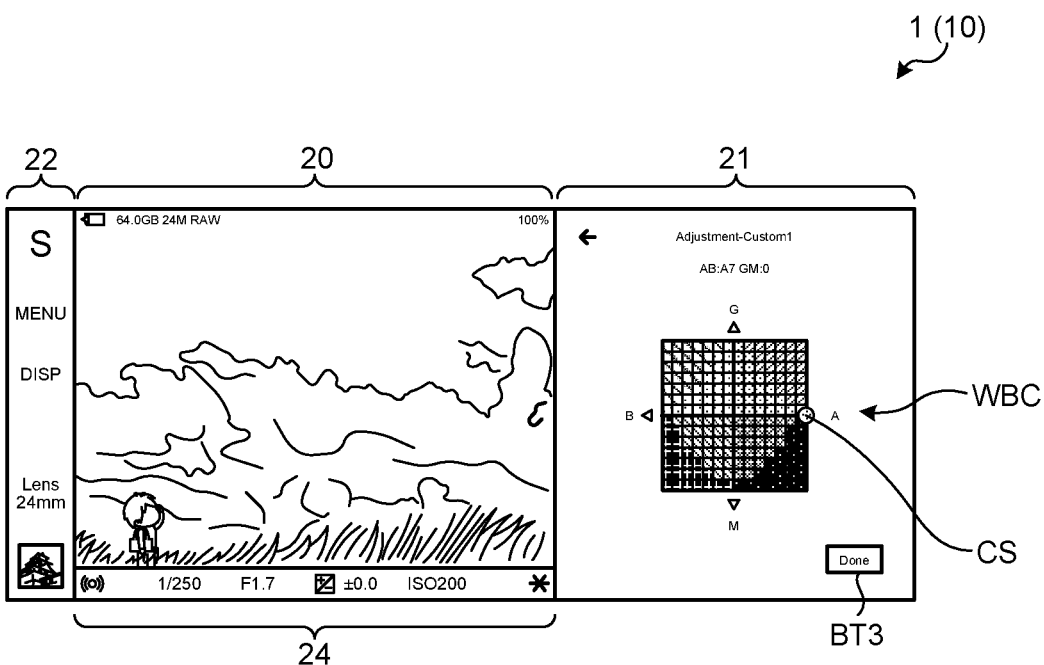
FIG. 11 is a diagram illustrating an example of the user interface of the camera application.

As illustrated in FIG. 10, the smartphone 1 adjusts the white balance based on the data of the image IM in the capturing frame FL. In the first operation area 21, a message MS2 including white balance information is displayed. When the user performs a touch operation on the adjustment key BT2, a white balance fine adjustment screen WBC illustrated in FIG. 11 is displayed. The user can finely adjust the white balance by moving coordinates of a cursor CS.

Figure 12:
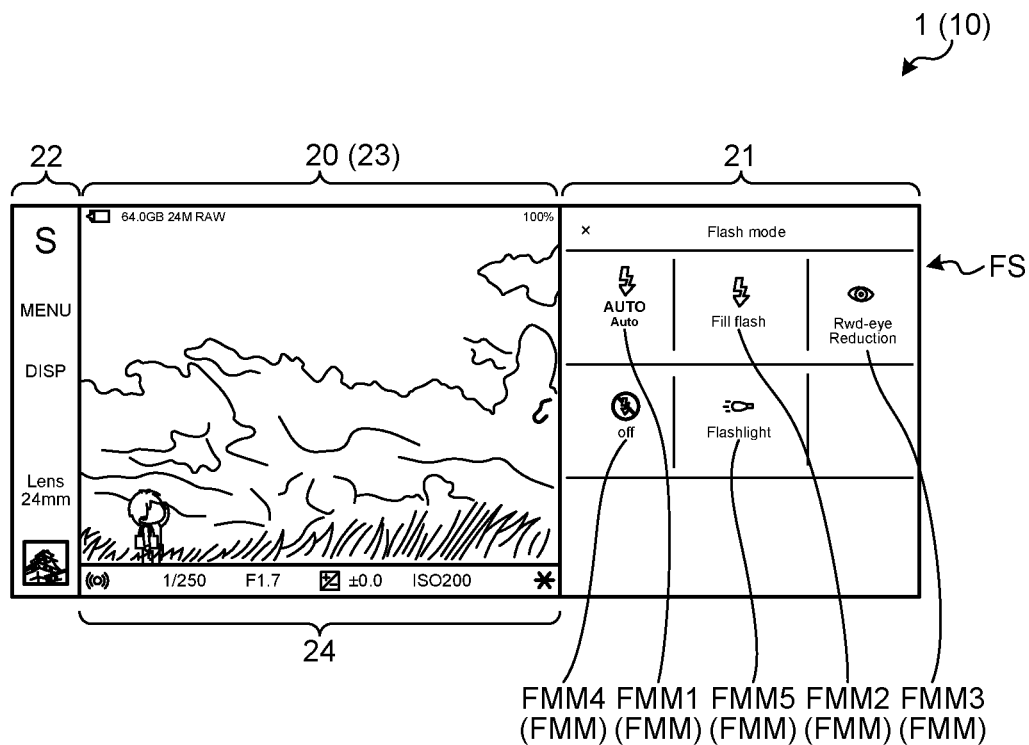
FIG. 12 is a diagram illustrating an example of the user interface of the camera application.

FIG. 12 is a diagram illustrating an example of a method of setting the flash mode.

In response to detection of a touch operation on the seventh function menu FM7, the smartphone 1 displays a flash mode setting screen FS. The flash mode setting screen FS is displayed, for example, in the first operation area 21.

On the flash mode setting screen FS, for example, a plurality of flash mode keys FMM indicating the flash modes are displayed. In FIG. 12, first to fifth flash mode keys FMM1 to FMM5 are displayed as the plurality of flash mode keys FMM.

The first flash mode key FMM1 is, for example, a software key indicating an automatic light emission mode. In the automatic light emission mode, the flash light 18 emits light when it is determined that an amount of light is insufficient or it is backlight condition. The second flash mode key FMM2 is, for example, a software key indicating a forced light emission mode. In the forced light emission mode, the flash light 18 always emits light. The third flash mode key FMM3 is, for example, a software key indicating a red-eye reduction light emission mode. In the red-eye reduction light emission mode, the flash light 18 performs preliminary light emission twice or more in order to reduce red eye at the time of flash photographing. The fourth flash mode key FMM4 is, for example, a software key indicating a light emission prohibition mode. The fifth flash mode key FMM5 is, for example, a software key indicating a mode of using the flash light 18 as a flashlight.

Figure 13:
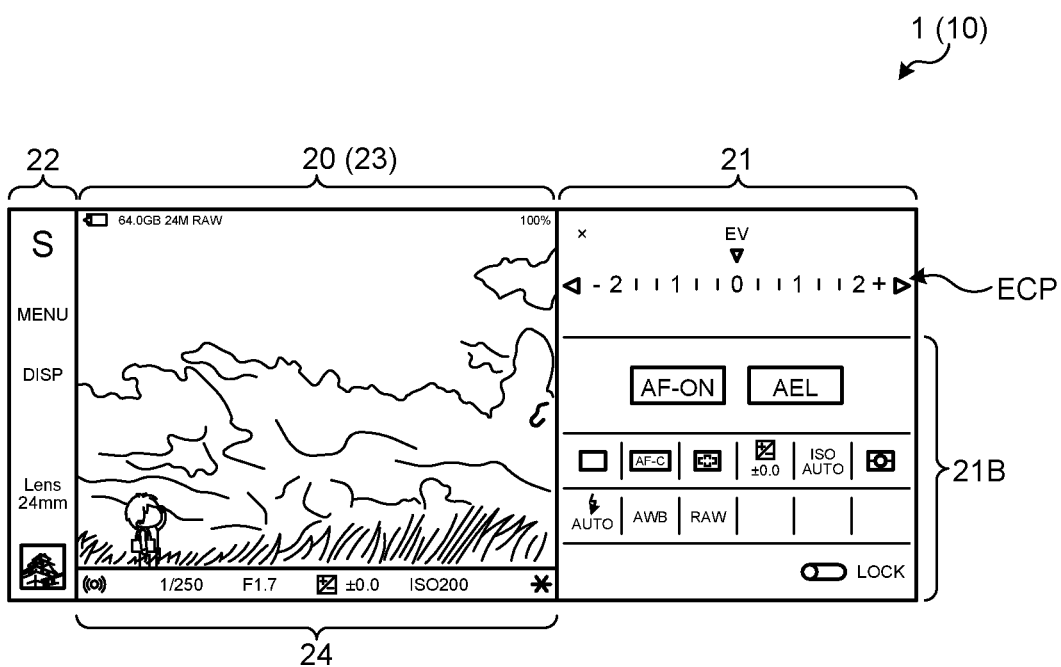
FIG. 13 is a diagram illustrating an example of the user interface of the camera application.

FIG. 13 is a diagram illustrating an example of an exposure setting method.

In response to detection of a touch operation on the fourth function menu FM4, the smartphone 1 displays the exposure control parameter setting screen ECP for setting an exposure value (EV) in the upper area 21A.

Returning to FIG. 4, in the second operation area 22, for example, a photographing mode key PMB, a menu key MB, a display switching key DSB, and a lens key LB are displayed in order from the upper side TS. In the second operation area 22, for example, a thumbnail screen PI for displaying a latest captured image as a thumbnail is displayed below the lens key LB.

The photographing mode key PMB is a software key indicating a photographing mode. In the camera application, for example, a plurality of photographing modes including a full auto mode (AUTO), a program auto mode (P), a shutter speed priority mode (S), and a manual mode (M) are prepared. The full auto mode is a photographing mode in which the shutter speed, the ISO sensitivity, and the exposure value are automatically set. The program auto mode is a photographing mode in which the exposure value is automatically set. The shutter speed priority mode is a photographing mode in which the user can manually set the shutter speed. The manual mode is a photographing mode in which the user can manually set the exposure value, the shutter speed, and the ISO sensitivity. In the second operation area 22, the photographing mode key PMB indicating a currently selected photographing mode among the plurality of photographing modes is displayed.

For example, the smartphone 1 displays a photographing mode selection screen PMS (see FIG. 14) in response to detection of a touch operation on the photographing mode key PMB. The photographing mode selection screen PMS is a screen to select one photographing mode from the plurality of photographing modes.

Figure 14:
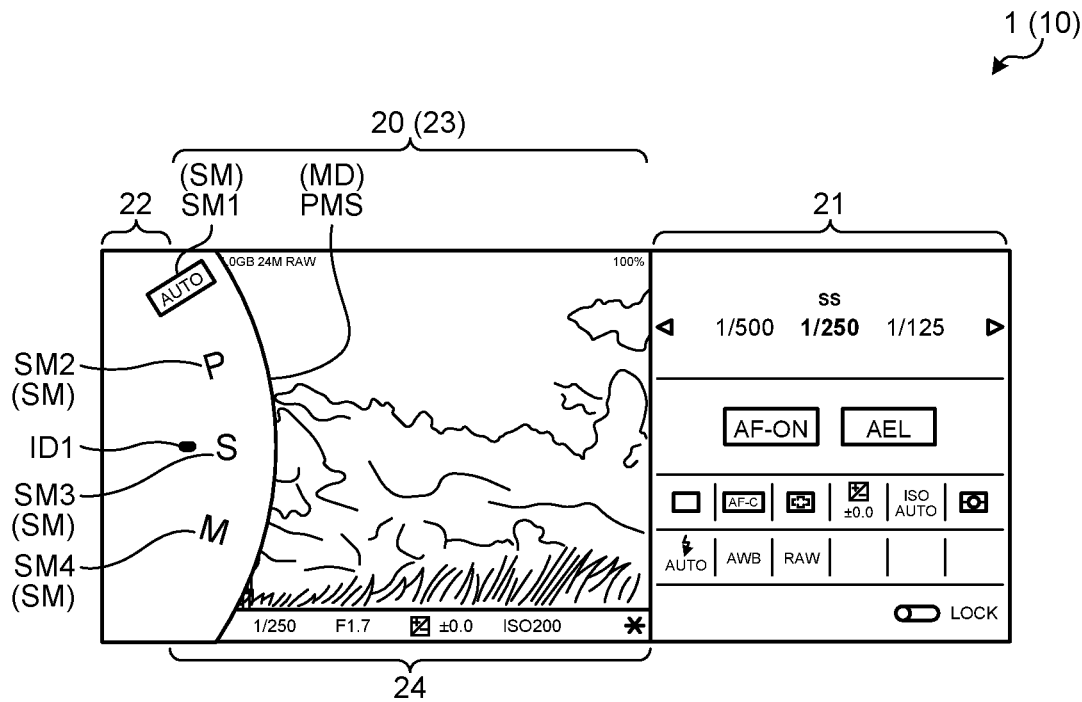
FIG. 14 is a diagram illustrating an example of the user interface of the camera application.

As illustrated in FIG. 14, the photographing mode selection screen PMS is displayed, for example, as a mode dial MD in which symbols SM indicating the photographing modes are displayed on an arc-shaped outer periphery. In the example of FIG. 14, a first mode symbol SM1 indicating the full auto mode (AUTO), a second mode symbol SM2 indicating the program auto mode (P), a third mode symbol SM3 indicating the shutter priority mode (S), and a fourth mode symbol SM4 indicating the manual mode (M) are displayed along the outer periphery of the mode dial MD. The user rotates the mode dial MD to adjust the symbol SM indicating the desired photographing mode to an index For example, the smartphone 1 specifies an exposure control parameter associated with the photographing mode by referring to the reference information RI. In the reference information RI, for example, a main exposure control parameter to be controlled in the photographing mode is defined for each photographing mode. For example, in response to selection of the photographing mode on the photographing mode selection screen PMS, the smartphone 1 displays the exposure control parameter setting screen ECP for setting an exposure control parameter associated with the selected photographing mode in the upper area 21A.

In the reference information RI, for example, an exposure value is defined as an exposure control parameter to be set on the exposure control parameter setting screen ECP in a case where the photographing mode is the program auto mode (P). In the reference information RI, for example, in a case where the photographing mode is the shutter speed priority mode (S) and the manual mode (M), the shutter speed is defined as the exposure control parameter to be set on the exposure control parameter setting screen ECP.

In the example of FIG. 4, the shutter speed priority mode (S) is set as the photographing mode. Therefore, the exposure control parameter setting screen ECP for setting the shutter speed (SS) as an exposure control parameter associated with the photographing mode is displayed in the upper area 21A. In the shutter speed priority mode (S), the ISO sensitivity is automatically set. Therefore, the fifth function menu FM5 for setting the ISO sensitivity is disabled.

Figure 5:
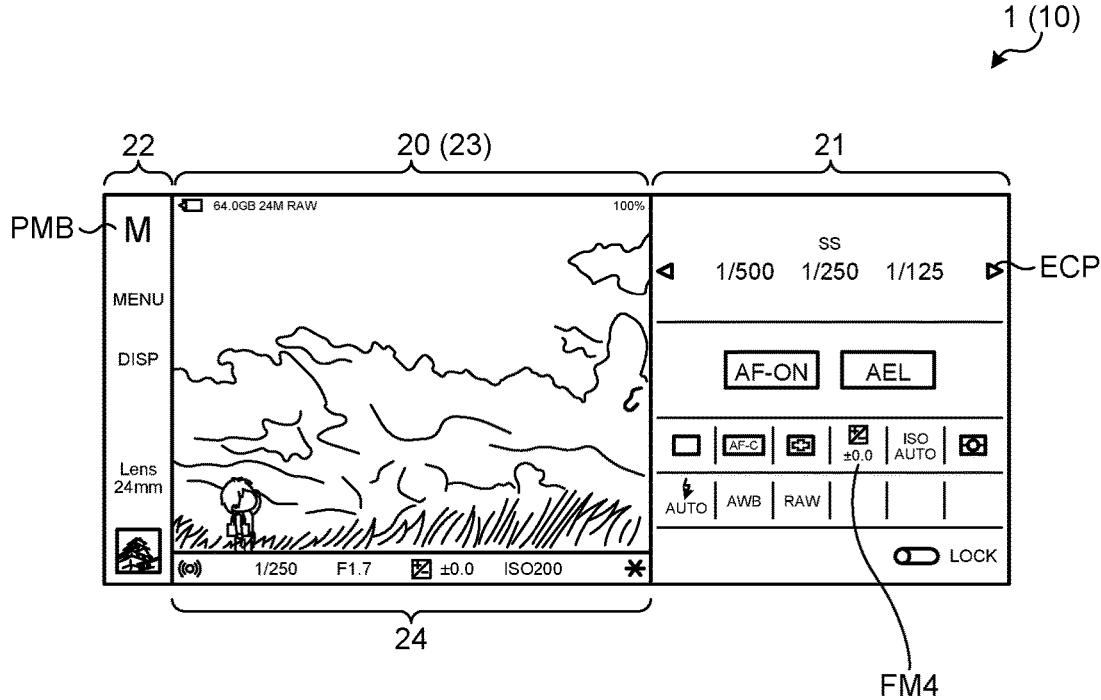
FIG. 5 is a diagram illustrating an example of the user interface of the camera application.

In the example of FIG. 5, the manual mode (M) is set as the photographing mode. Therefore, the exposure control parameter setting screen ECP for setting the shutter speed (SS) as an exposure control parameter associated with the photographing mode is displayed in the upper area 21A. In the manual mode (M), exposure correction can be performed only when the ISO sensitivity is in an auto mode. In the example of FIG. 5, the ISO sensitivity is manually set. Therefore, the fourth function menu FM4 for setting the exposure value is disabled.

Figure 6:
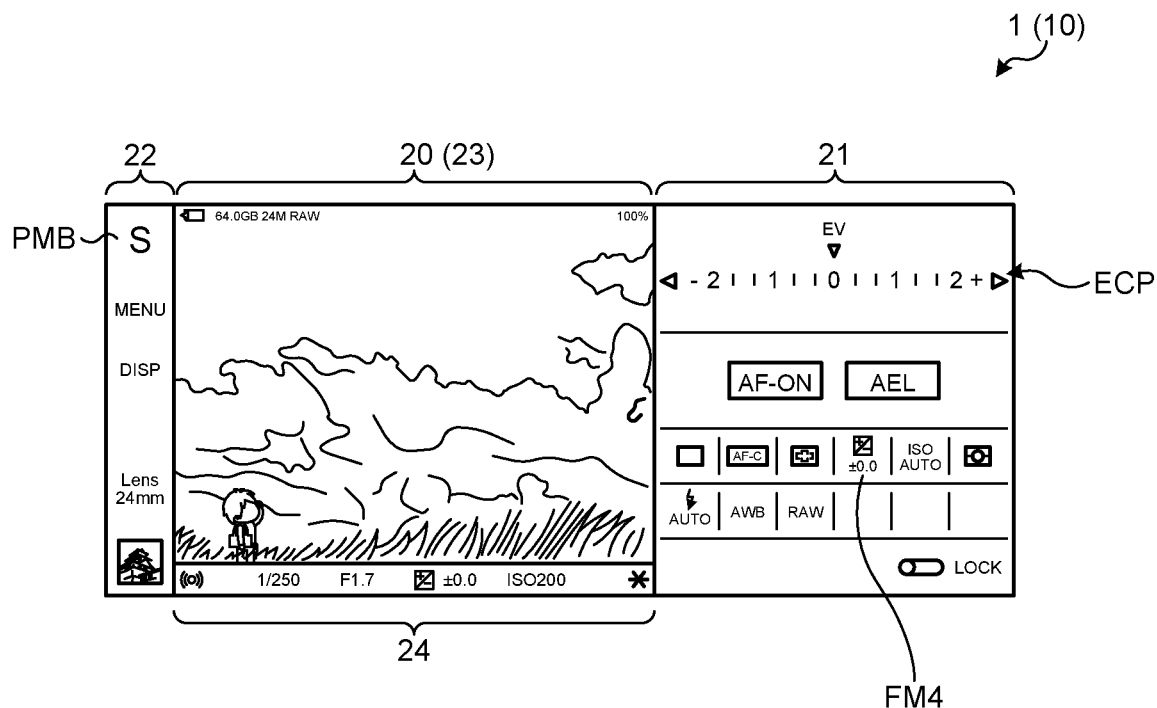
FIG. 6 is a diagram illustrating an example of the user interface of the camera application.

In the example of FIG. 6, the program auto mode (P) is set as the photographing mode. Therefore, the exposure control parameter setting screen ECP for setting the exposure value (EV) as an exposure control parameter associated with the photographing mode is displayed in the upper area 21A. In the program auto mode (P), the exposure value is automatically set. Therefore, the fourth function menu FM4 for setting the exposure value is disabled.

Figure 7:
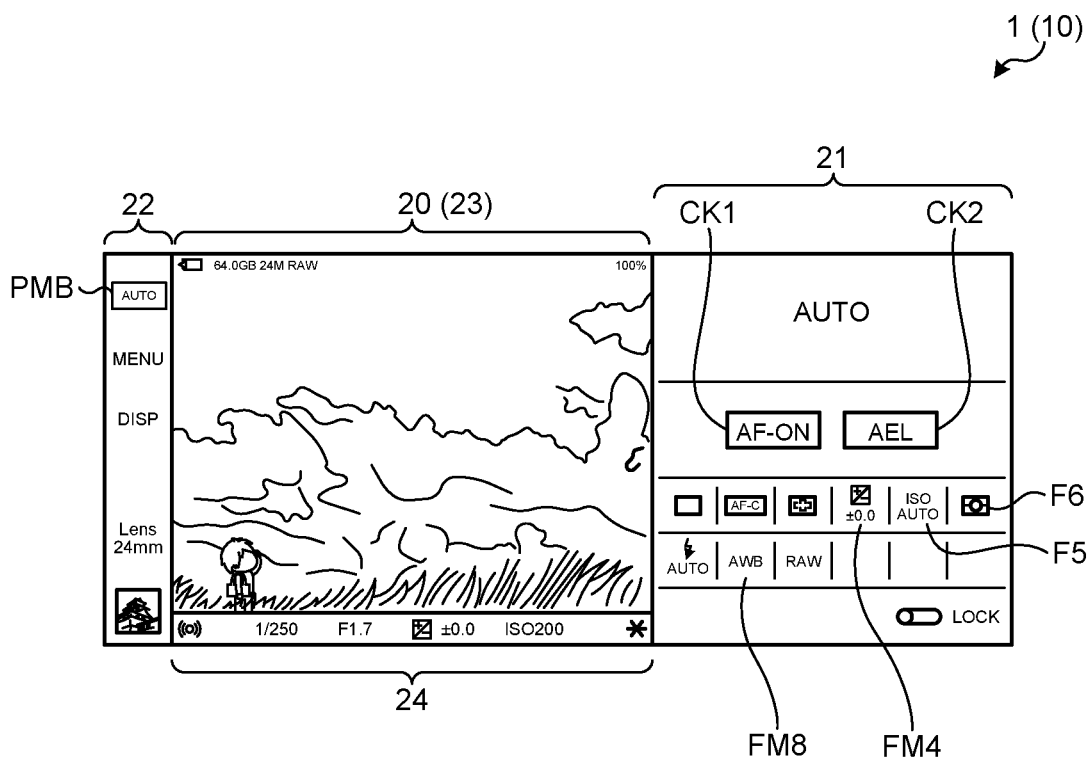
FIG. 7 is a diagram illustrating an example of the user interface of the camera application.

In the example of FIG. 7, the full auto mode (AUTO) is set as the photographing mode. In the full auto mode (AUTO), the shutter speed, the ISO sensitivity, and the exposure value are automatically set. Therefore, the exposure control parameter setting screen ECP is not displayed in the upper area 21A. The second custom key CK2 and the fourth function menu FM4 related to the exposure correction, and the fifth function menu FM5 for setting the ISO sensitivity are also disabled. In the full auto mode (AUTO), the focus, white balance, and photometry modes are also automatically set. Therefore, the first custom key CK1 related to the focus setting, the sixth function key FM6 for setting the photometry mode, and the eighth function key FM8 for setting the white balance are also disabled.

The menu key MB is a software key for changing settings related to the entire camera, such as photographing, reproduction, and operation methods, and executing camera functions.

The display switching key DSB is a software key for setting a screen display mode of the monitor screen 20. As the screen display mode at the time of photographing, for example, a graphic display mode, an all-information display mode, an information display stop mode, a level display mode, and a histogram display mode can be set. The graphic display mode is a mode in which basic photographing information is displayed in the header area 23, and a shutter speed and a diaphragm are graphically displayed on the monitor screen 20. The all-information display mode is a mode for displaying detailed photographing information on the monitor screen 20. The information display stop mode is a mode for stopping the display of the photographing information on the monitor screen 20. The level display mode is a mode in which a level LEV (see FIG. 18) indicating front, rear, left, and right inclinations of the smartphone 1 is displayed on the monitor screen 20. The histogram display mode is a mode in which a histogram HG (see FIG. 18) indicating the distribution of the brightness of an image is displayed on the monitor screen 20.

The lens key LB is a software key indicating a photographing camera lens. The smartphone 1 incorporates the plurality of camera lenses 17 having different focal lengths. Among the plurality of camera lenses 17, one camera lens 17 selected for photographing is a photographing camera lens. In the second operation area, the lens key LB indicating the camera lens 17 currently selected for photographing is displayed. In the example of FIG. 4, the second camera lens 17B having a focal length of 24 mm is selected.

For example, the smartphone 1 displays a lens selection screen LES (see FIG. 15) in response to detection of a touch operation on the lens key LB. The lens selection screen LES is a screen to select a photographing camera lens to be used for photographing from the plurality of camera lenses 17.

Figure 15:
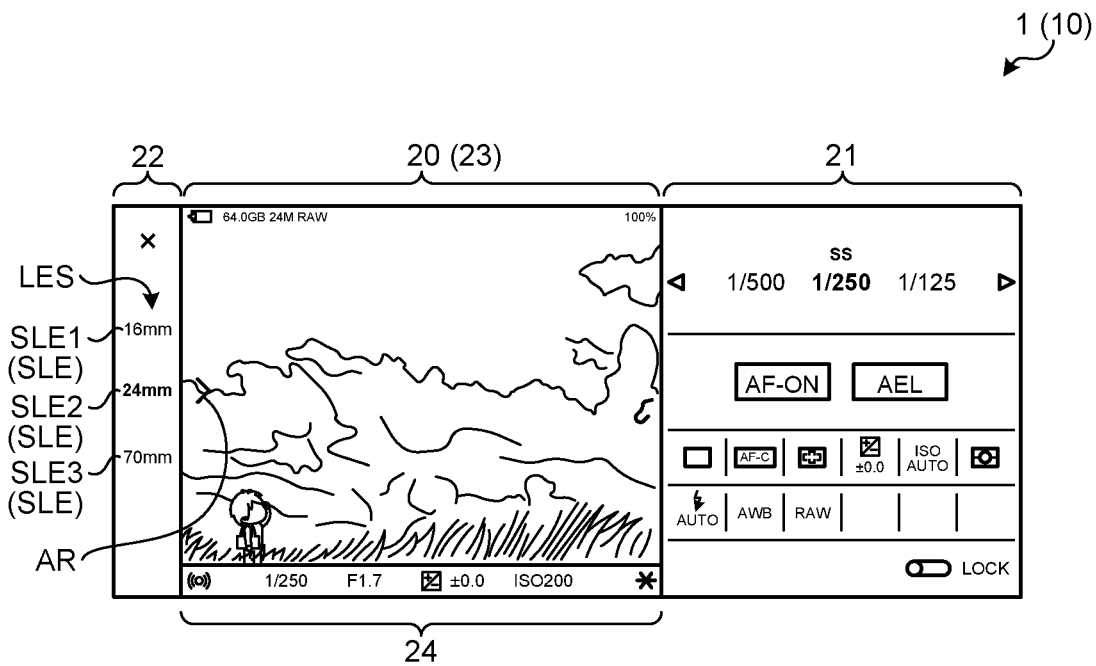
FIG. 15 is a diagram illustrating an example of the user interface of the camera application.

As illustrated in FIG. 15, for example, a plurality of lens buttons SLE are displayed on the lens selection screen LES. In the example of FIG. 15, a first lens button SLE1, a second lens button SLE2, and a third lens button SLE3 are displayed as the plurality of lens buttons SLE. The first lens button SLE1 corresponds to the first camera lens 17A. The second lens button SLE2 corresponds to the second camera lens 17B. The third lens button SLE3 corresponds to the third camera lens 17C.

For example, an arrow key AR is displayed at a position adjacent to the lens buttons SLE. For example, the smartphone 1 displays a zoom setting screen ZS (see FIG. 16) in response to detection of a touch operation on the arrow key AR displayed on the lens selection screen LES. A range of the magnification of the digital zoom set on the zoom setting screen ZS is, for example, a range starting from an angle of view of the photographing camera lens. On the zoom setting screen ZS, the magnification of the digital zoom starting from the angle of view of the photographing camera lens is set.

Figure 16:
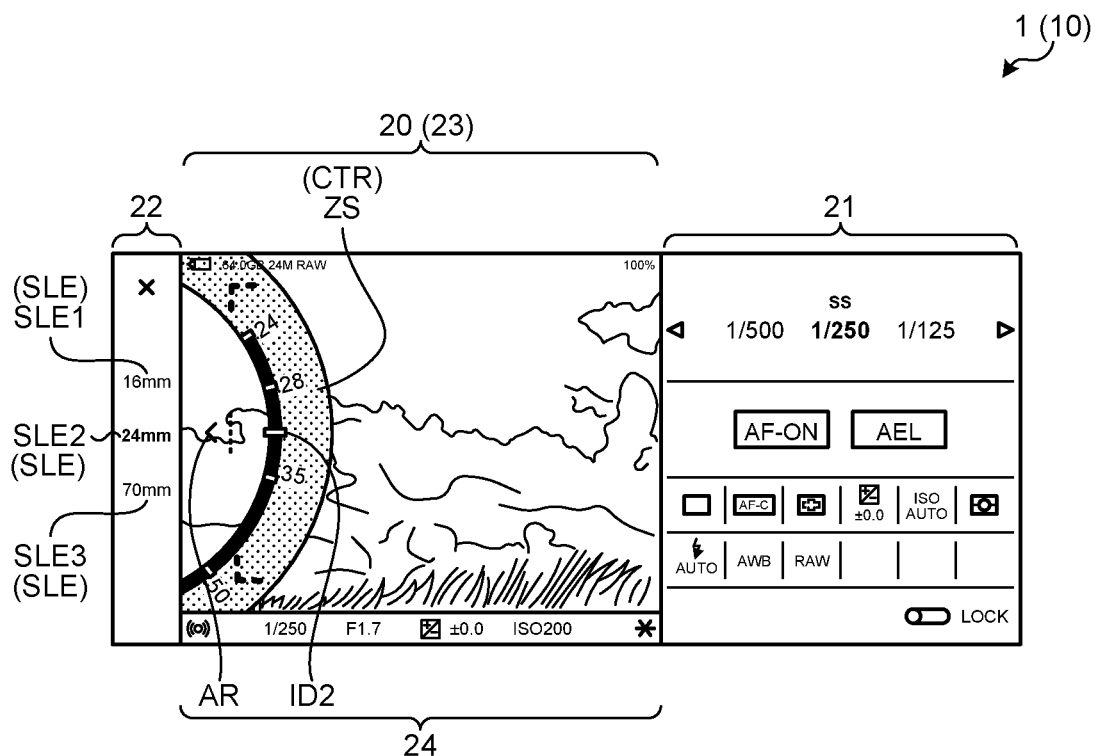
FIG. 16 is a diagram illustrating an example of the user interface of the camera application.

As illustrated in FIG. 16, the zoom setting screen ZS is displayed as a control ring CTR in which scales indicating focal lengths corresponding to the magnification of the digital zoom are displayed on an arc-shaped outer periphery. The user rotates the control ring CTR to set the scale of a desired focal length to an index ID2. The smartphone 1 displays an image with the magnification corresponding to a rotation amount of the control ring CTR on the monitor screen 20.

The magnification of the digital zoom can also be set by a pinch operation on the touch screen 10. The pinch operation is a touch operation of widening or narrowing a distance between two fingers while bringing the two fingers into contact with the touch screen 10. The smartphone detects a change amount of the distance between the two fingers as a pinch amount. For example, in response to detection of the pinch operation on the monitor screen 20, the smartphone 1 displays an image with a magnification corresponding to the pinch amount on the monitor screen 20. The smartphone 1 rotates the control ring CTR by a rotation amount corresponding to the magnification set by the pinch operation.

Figure 17:
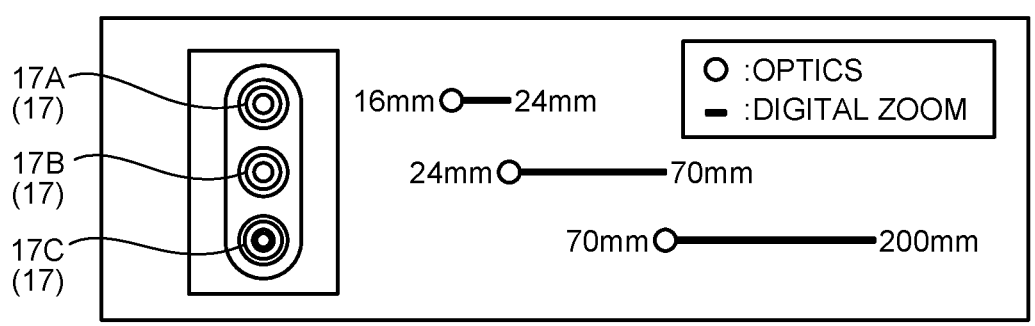
FIG. 17 is a diagram illustrating an example of the user interface of the camera application.
Figure 18:
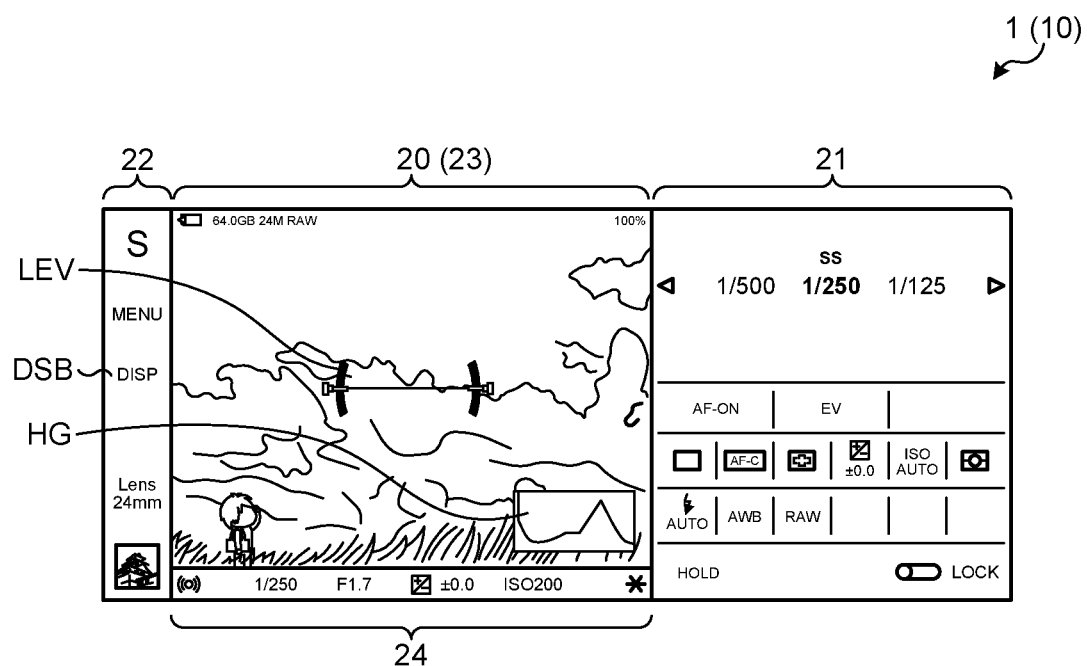
FIG. 18 is a diagram illustrating an example of the user interface of the camera application.

As illustrated in FIG. 17, a settable magnification of the digital zoom varies depending on a focal length of the camera lens 17. For example, in a case where the first camera lens having a focal length of 16 mm is selected, the settable magnification range of the digital zoom is 16 mm or more and 24 mm or less. In a case where the second camera lens 17B having a focal length of 24 mm is selected, the settable magnification range of the digital zoom is 24 mm or more and 70 mm or less. In a case where the third camera lens 17C having a focal length of 70 mm is selected, the settable magnification range of the digital zoom is 70 mm or more and 200 mm or less.

The magnification range of the digital zoom that can be set for the camera lens 17 other than the camera lens 17 (maximum focal length lens) having a maximum focal length is a range from the focal length of the camera lens 17 to the focal length of the camera lens 17 having next larger focal length after the camera lens 17. In the control ring CTR, for the photographing camera lens 17 other than the maximum focal length lens, scales from the focal length of the photographing camera lens to the focal length of the camera lens 17 having next larger focal length after the photographing camera lens is displayed.

When the magnification is increased beyond the settable range, it is necessary to change a photographing lens to a camera lens having next larger focal length after the currently set camera lens on the lens setting screen LES. This operation is similar to a digital camera. Therefore, the zoom operation can be performed with the same feeling as the digital camera.

Figure 19:
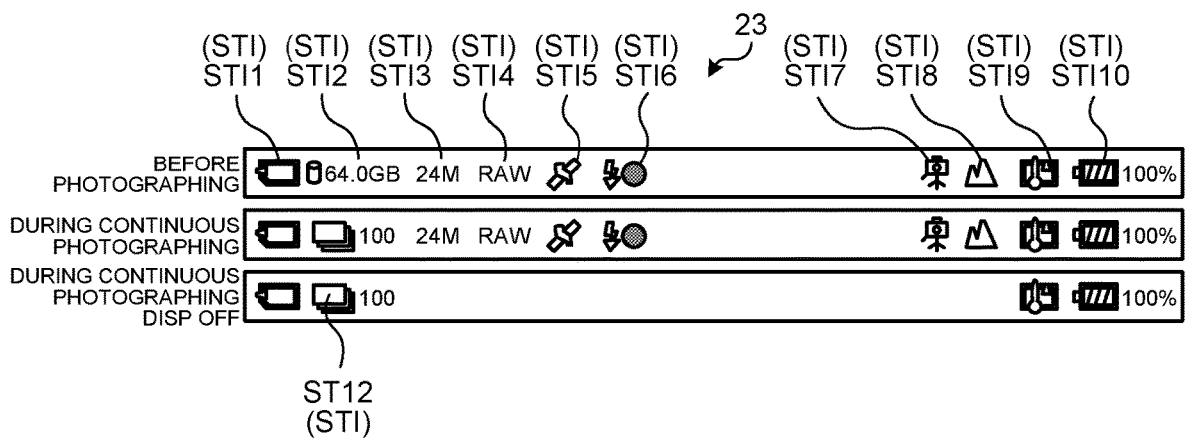
FIG. 19 is a diagram illustrating an example of the user interface of the camera application.
Figure 20:
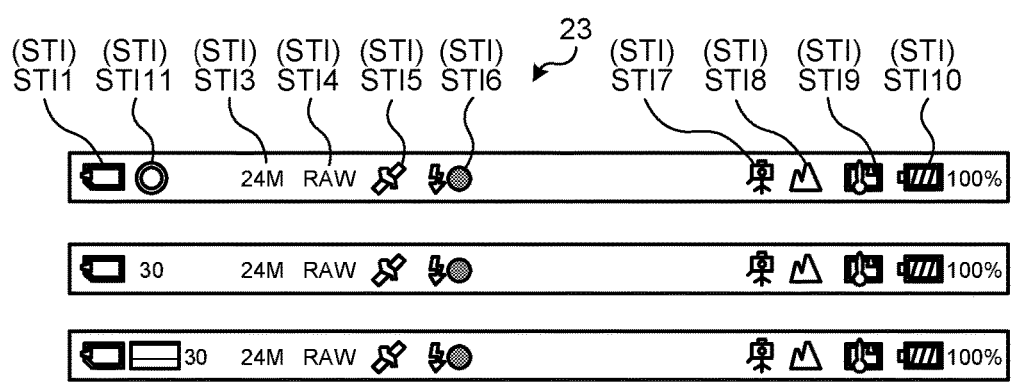
FIG. 20 is a diagram illustrating an example of the user interface of the camera application.

As illustrated in FIG. 19, in the header area 23, various pieces of information corresponding to the situation are symbolized and displayed. For example, information STI1 indicates information regarding an insertion status of the memory card. Information STI2 indicates information regarding a storage capacity capable of photographing or the number of continuously capturable photographs. Information STI3 indicates information on an image size of a still image. Information STI4 indicates information on a storage format of an image. Information STI5 indicates information on camera shake correction. Information STI6 indicates information on a flash charging status. Information STI7 and information STI8 indicate information on a photographing scene. Information STI9 indicates information on a warning level of temperature rise. Information STI10 indicates information on a remaining battery capacity. During data writing, for example, as illustrated in FIG. 20, information STI11 indicating a data writing status is displayed in the header area 23. The remaining time until the completion of the data writing may not be displayed (an upper part of FIG. 20) or may be displayed (a middle part and a lower part of FIG. 20). In the header area 23, for example, the number of captured images is displayed in a count-up format. During data writing, a progress indicator illustrated in the upper part of FIG. 20 rotates.

Returning to FIG. 4, information regarding the focus setting and the exposure setting is symbolized and displayed in the footer area 24. In FIG. 4, for example, information FCI related to focus setting, information indicating a shutter speed (SS), information FNI indicating an aperture value (F), information EI indicating an exposure value (EV), information SI indicating an ISO sensitivity, and information AEI related to auto exposure (AE) lock setting are displayed in the footer area 24.

1-3. Information Processing Method

Figure 21:
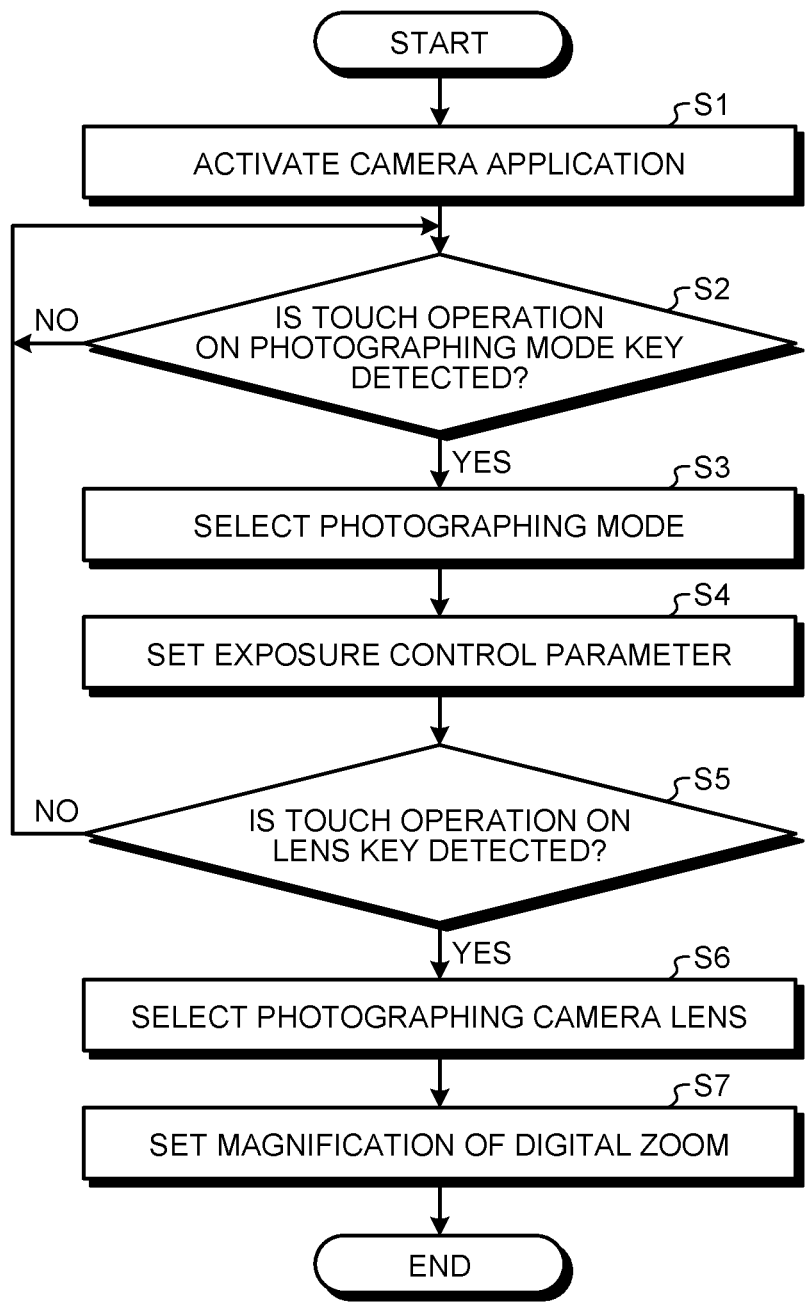
FIG. 21 is a flowchart illustrating an example of an information processing method.

FIG. 21 is a flowchart illustrating an example of an information processing method of the present embodiment.

In Step S1, the smartphone 1 activates the camera application. In Step S2, the smartphone 1 determines whether or not a touch operation on the photographing mode key PMB has been detected. When a touch operation on the photographing mode key PMB is detected (Step S2: Yes), the processing proceeds to Step S3. When the touch operation on the photographing mode key PMB is not detected (Step S2: No), Step S2 is repeated.

In Step S3, the smartphone 1 displays the photographing mode setting screen PMS in response to detection of the touch operation on the photographing mode key PMB. The smartphone 1 selects a photographing mode based on the user's touch operation on the photographing mode setting screen PMS.

In Step S4, in response to selection of the photographing mode on the photographing mode selection screen PMS, the smartphone 1 displays the exposure control parameter setting screen ECP for setting an exposure control parameter associated with the selected photographing mode. The smartphone 1 sets the exposure control parameter based on the user's touch operation on the exposure control parameter setting screen ECP.

In Step S5, the smartphone 1 determines whether or not a touch operation on the lens key LB has been detected. When it is determined that the touch operation on the lens key LB is detected (Step S5: Yes), the processing proceeds to Step S6. When it is not determined that the touch operation on the lens key LB is detected (Step S5: No), the processing returns to Step S2.

In Step S6, the smartphone 1 displays the lens selection screen LES in response to detection of the touch operation on the lens key LB. The smartphone 1 selects the photographing camera lens based on the user's touch operation on the lens selection screen LES.

In Step S7, the smartphone 1 displays the zoom setting screen ZS in response to detection of a touch operation on the arrow key AR displayed on the lens selection screen LES. A magnification range of the digital zoom set on the zoom setting screen ZS is a range starting from the angle of view of the photographing camera lens. The smartphone 1 sets the magnification of the digital zoom based on the user's touch operation on the zoom setting screen ZS.

1-4. Effects

The program P of the present embodiment causes the smartphone 1 incorporating the plurality of camera lenses 17 having different focal lengths to execute processing of displaying the photographing mode selection screen PMS, the lens selection screen LES, and the exposure control parameter setting screen ECP. The photographing mode selection screen PMS is a screen to select a photographing mode. The lens selection screen LES is a screen to select a photographing camera lens to be used for photographing from the plurality of camera lenses 17. The exposure control parameter setting screen ECP is a screen to set the exposure control parameter. The information processing method of the present embodiment is realized by the program P of the present embodiment.

According to this configuration, the user can appropriately control the photographing mode, the photographing camera lens, and the exposure control parameter according to the photographing situation. The range in which the user can be involved in the image quality is wide. Therefore, the user who is familiar with the camera can be sufficiently satisfied.

The program P of the present embodiment causes, for example, the smartphone 1 to execute processing of displaying the photographing mode key PMB indicating a photographing mode. The program P causes the smartphone 1 to execute processing of displaying the photographing mode selection screen PMS in response to detection of a touch operation on the photographing mode key PMB. In response to selection of the photographing mode on the photographing mode selection screen PMS, the program P causes the smartphone 1 to execute processing of displaying the exposure control parameter setting screen ECP for setting an exposure control parameter associated with the selected photographing mode.

According to this configuration, the currently selected photographing mode can be easily recognized by the photographing mode key PMB. When the photographing mode key PMB is touched, the photographing mode selection screen PNS can be easily called up. When the photographing mode is selected, the exposure control parameter related to the photographing mode can be rapidly adjusted.

The program P of the present embodiment causes, for example, the smartphone 1 to execute processing of displaying the lens key LB indicating the photographing camera lens. The program P causes the smartphone 1 to execute processing of displaying the lens selection screen LES in response to detection of a touch operation on the lens key LB.

According to this configuration, the currently selected camera lens 17 can be easily recognized by the lens key LB. When the lens key LB is touched, the lens selection screen LES can be easily called. The operation of selecting the camera lens 17 is similar to the operation of replacing the camera lens on a digital camera. Therefore, photographing can be performed with the same feeling as the digital camera.

For example, the program P of the present embodiment causes the smartphone 1 to execute processing of displaying the zoom setting screen ZS in response to detection of a touch operation on the arrow key AR displayed on the lens selection screen LES. On the zoom setting screen ZS, the magnification of the digital zoom starting from the angle of view of the photographing camera lens is set.

According to this configuration, the selection of the camera lens 17 and the setting of the magnification of the digital zoom can be continuously performed.

The zoom setting screen ZS is displayed, for example, as the control ring CTR. In the control ring CTR, for example, scales indicating focal lengths corresponding to the magnification of the digital zoom are displayed on the arc-shaped outer periphery.

A method of converting the angle of view into the focal length and displaying the focal length is a method familiar to a user who photographs with a digital camera. The control ring CTR is also used in a digital camera as a member that performs zooming. Therefore, the zoom operation can be performed with the same feeling as the digital camera.

The program P of the present embodiment causes, for example, the smartphone 1 to execute processing of displaying an image with the magnification corresponding to the rotation amount of the control ring CTR on the monitor screen 20.

According to this configuration, the zoom operation can be performed with the same feeling as the digital camera.

For example, the program P of the present embodiment causes the smartphone 1 to execute processing of displaying an image with a magnification corresponding to the pinch amount on the monitor screen 20 in response to detection of a pinch operation on the monitor screen 20. The program P causes the smartphone 1 to execute processing of rotating the control ring CTR by a rotation amount corresponding to the magnification.

According to this configuration, the zoom operation can be performed not only by the control ring CTR but also by the pinch operation unique to the smartphone. The magnification set by the pinch operation can be accurately grasped by the rotation amount of the control ring CTR.

The photographing mode selection screen PMS is displayed as the mode dial MD, for example. In the mode dial MD, for example, symbols indicating the photographing modes are displayed on the arc-shaped outer periphery.

The mode dial MD is used in a digital camera as a member for setting a photographing mode. Therefore, the photographing mode can be selected with the same feeling as the digital camera.

On the side surface of the smartphone 1, for example, the camera key 14 for performing a shutter operation is provided. When one side of the touch screen 10 of the smartphone 1 facing the camera key 14 is set as the upper side TS, the exposure control parameter setting screen ECP is displayed, for example, in an operation area (first operation area 21) along the right side RS of the touch screen 10.

According to this configuration, it is possible to adjust the exposure control parameter with the thumb R1 of the right hand HR while pressing the camera key 14 with the index finger R2 of the right hand HR. Therefore, the exposure adjustment and the shutter operation can be smoothly performed.

The photographing mode key PMB is displayed, for example, in an operation area (second operation area 22) along the left side LS of the touch screen 10.

According to this configuration, the photographing mode can be set with a thumb L1 of the left hand HL.

The exposure control parameter setting screen ECP is displayed, for example, in an area facing the upper side TS in the first operation area 21.

According to this configuration, the index finger R2 holding the camera key 14 and the thumb R1 are arranged at close positions. Therefore, the thumb R1 can be smoothly moved. Further, the camera key 14, the exposure control parameter adjustment screen ECP, and the monitor screen 20 can be visually recognized at the same time. Therefore, the exposure adjustment and the shutter operation can be smoothly performed without moving the line of sight.

For example, the program P of the present embodiment causes the smartphone 1 to execute processing of displaying the plurality of function menus FM in an area adjacent to the exposure control parameter setting screen ECP in the first operation area 21.

According to this configuration, by registering frequently used functions in the function menus FM, the functions can be quickly called.

1-5. Modification Example

In the above embodiment, the smartphone 1 has been described as an example of the electronic device. However, the electronic device to which the above-described camera function can be applied is not limited to a smartphone. The above-described camera function may be applied to a tablet terminal, a notebook personal computer, a mobile phone other than a smartphone, and the like.

2. Second Embodiment 2-1. User Interface of Camera Application

Figure 22:
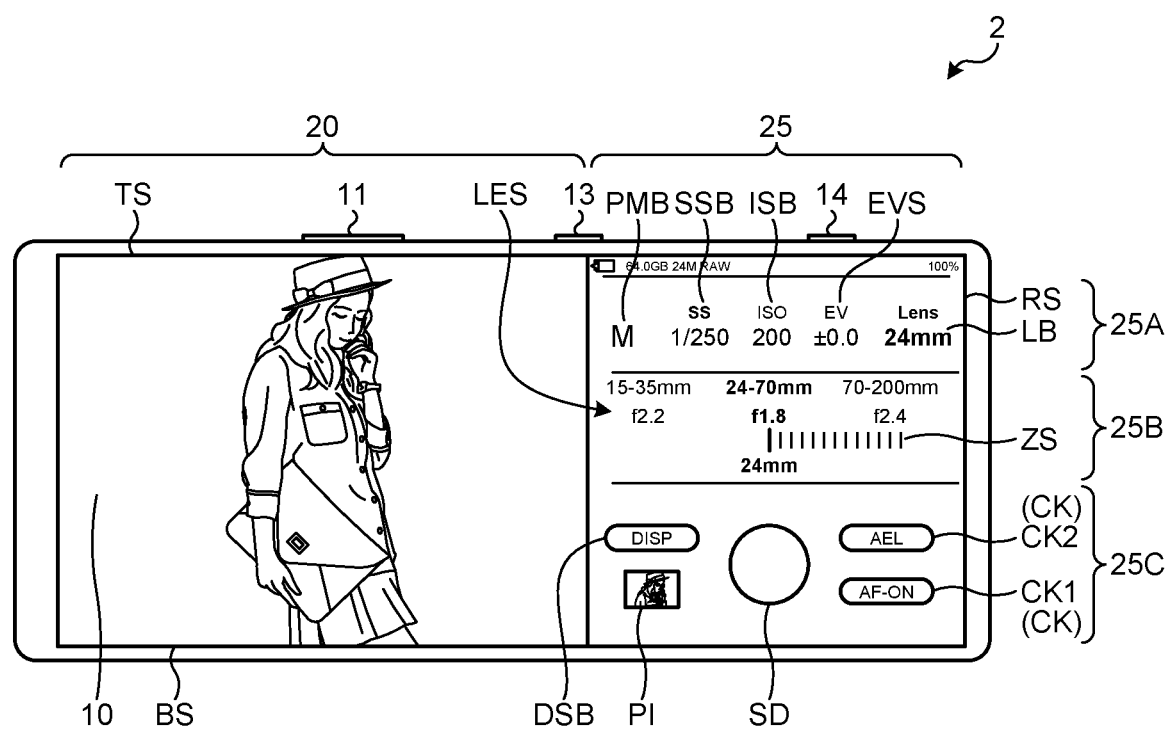
FIG. 22 is a diagram illustrating an example of a user interface of a camera application according to a second embodiment.

FIG. 22 is a diagram illustrating an example of a user interface of a camera application according to the second embodiment.

The present embodiment is different from the first embodiment in a layout of the screen of the camera application. Only an operation area 25 along the right side RS of the touch screen 10 is provided around the monitor screen 20. Hereinafter, differences from the first embodiment will be mainly described.

The monitor screen 20 is displayed on the left side of the touch screen 10. The operation area 25 where the photographing mode key PMB and the lens key LB are displayed is aggregated on the right side of the monitor screen 20. The information displayed in the header area 23 in the first embodiment is displayed in an area along the upper side TS of the operation area 25.

The operation area 25 is divided into, for example, an upper area 25A, a center area 25B, and a lower area 25C. The upper area 25A is an area facing the upper side TS in the operation area 25. The lower area 25C is an area facing the lower side BS in the operation area 25. The center area 25B is an area sandwiched between the upper area 25A and the lower area 25C.

In the upper area 25A, for example, the photographing mode key PMB, a shutter speed setting key SSB, an ISO sensitivity setting key ISB, an exposure value setting key EVS, and the lens key LB are displayed. In the center area 25B, for example, the photographing mode selection screen PMS, the lens selection screen LES, and the exposure control parameter setting screen EPC are alternatively displayed. In the lower area 25C, for example, a dial SD, the display switching key DSB, the first custom key CK1, the second custom key CK2, and the thumbnail screen PI are displayed.

For example, in response to detection of a touch operation on the photographing mode key PMS, a smartphone 2 displays the photographing mode selection screen PMS in the center area 25B. For example, in response to detection of a touch operation on the shutter speed setting key SSB, the smartphone 2 displays the exposure control parameter setting screen ECP for setting the shutter speed in the center area 25B. For example, in response to detection of a touch operation on the ISO sensitivity setting key ISB, the smartphone 2 displays the exposure control parameter setting screen ECP for setting the ISO sensitivity in the center area 25B. For example, in response to detection of a touch operation on the lens key LB, the smartphone 2 displays the lens selection screen LES and the zoom setting screen ZS in the center area 25B. The selection of the photographing mode, the value of the exposure control parameter, and the magnification of the digital zoom can be set by directly touching the setting screens displayed in the center area 25B, or can also be set by rotating the dial SD.

2-2. Effects

In the present embodiment, the operation area 25 is aggregated in the vicinity of the camera key 14. Therefore, it is possible to select the photographing mode, select the camera lens for photographing, set the magnification of digital zoom, and set the exposure control parameter by an operation with the thumb R1 of the right hand HR.

In addition, the effects described in the present specification are merely examples and are not limited, and other effects may be provided.

Note that the present technique can also have configurations below.

(1)

A program for causing an electronic device including a plurality of built-in camera lenses having different focal lengths to execute processing of displaying a photographing mode selection screen to select a photographing mode, a lens selection screen to select a photographing camera lens to be used for photographing from the plurality of camera lenses, and an exposure control parameter setting screen to set an exposure control parameter.

(2)

The program according to (1), causing the electronic device to execute processing of:

displaying a photographing mode key indicating the photographing mode;

displaying the photographing mode selection screen in response to detection of a touch operation on the photographing mode key; and in response to selection of the photographing mode on the photographing mode selection screen, displaying the exposure control parameter setting screen to set the exposure control parameter associated with the selected photographing mode.

(3)

The program according to (1), causing the electronic device to execute processing of:

displaying a lens key indicating the photographing camera lens; and displaying the lens selection screen in response to detection of a touch operation on the lens key.

(4)

The program according to (1), causing the electronic device to execute processing of in response to detection of a touch operation on an arrow key displayed on the lens selection screen, displaying a zoom setting screen to set a magnification of digital zoom starting from an angle of view of the photographing camera lens.

(5)

The program according to (4), wherein the zoom setting screen is displayed as a control ring in which a scale indicating a focal length corresponding to a magnification of the digital zoom is displayed on an arc-shaped outer periphery.

(6)

The program according to (5), causing the electronic device to execute processing of displaying, on a monitor screen, an image with a magnification corresponding to a rotation amount of the control ring.

(7)

The program according to (6), causing the electronic device to execute processing of:

in response to detection of a pinch operation on the monitor screen, displaying an image with a magnification corresponding to a pinch amount on the monitor screen; and rotating the control ring by a rotation amount corresponding to the magnification.

(8)

The program according to (1), wherein the photographing mode selection screen is displayed as a mode dial in which a symbol indicating the photographing mode is displayed on an arc-shaped outer periphery.

(9)

The program according to (1), wherein a camera key that performs a shutter operation is provided on a side surface of the electronic device, and when one side of a touch screen of the electronic device facing the camera key is an upper side, the exposure control parameter setting screen is displayed in an operation area along a right side of the touch screen.

(10)

The program according to (9), wherein the exposure control parameter setting screen is displayed in an area facing the upper side in the operation area.

(11)

The program according to (10), causing the electronic device to execute processing of displaying a plurality of function menus in an area adjacent to the exposure control parameter setting screen in the operation area.

(12)

An information processing method in which an electronic device including a plurality of built-in camera lenses having different focal lengths executes processing of displaying a photographing mode selection screen to select a photographing mode, a lens selection screen to select a photographing camera lens to be used for photographing from the plurality of camera lenses, and an exposure control parameter setting screen to set an exposure control parameter.

(13)

An electronic device comprising:

a plurality of camera lenses having different focal lengths; and a touch screen that displays a photographing mode selection screen to select a photographing mode, a lens selection screen to select a photographing camera lens to be used for photographing from the plurality of camera lenses, and an exposure control parameter setting screen to set an exposure control parameter.

REFERENCE SIGNS LIST 1, 2 Smartphone (Electronic Device)
10 Touch Screen
14 Camera Key
17 Camera Lens
20 Monitor Screen
21, 25 Operation Area
AR Arrow Key CTR Control Ring
ECP Exposure Control Parameter Setting Screen
LB Lens Key
LES Lens Selection Screen
MD Mode Dial
P Program
PMB Photographing Mode Key
PMS Photographing Mode Selection Screen
ZS Zoom Setting Screen

The invention claimed is:

1. A non-transitory computer-readable medium having stored thereon, computer-executable instructions which, when executed by an electronic device including a plurality of built-in camera lenses having different focal lengths, cause the electronic device to execute operations, the operations comprising:
displaying a photographing mode selection screen to select a photographing mode, a lens selection screen to select a photographing camera lens for photographing from the plurality of built-in camera lenses, and an exposure control parameter setting screen to set an exposure control parameter,
wherein the photographing mode selection screen is displayed as a mode dial in which a symbol indicating the photographing mode is displayed on an arc-shaped outer periphery of the mode dial.

2. The non-transitory computer-readable medium according to claim 1, the operations further comprising:
displaying a photographing mode key indicating the photographing mode;
detecting a touch operation on the photographing mode key;
displaying the photographing mode selection screen based on the detection of the touch operation on the photographing mode key; and
displaying, based on the selection of the photographing mode on the photographing mode selection screen, the exposure control parameter setting screen to set the exposure control parameter associated with the selected photographing mode.

3. The non-transitory computer-readable medium according to claim 1, the operations further comprising:
displaying a lens key indicating the photographing camera lens;
detecting a touch operation on the lens key; and
displaying the lens selection screen based on the detection of the touch operation on the lens key.

4. The non-transitory computer-readable medium according to claim 1, the operations further comprising:
detecting a touch operation on an arrow key displayed on the lens selection screen; and
displaying, based on the detection of the touch operation on the arrow key, a zoom setting screen to set a first magnification of digital zoom starting from an angle of view of the photographing camera lens.

5. The non-transitory computer-readable medium according to claim 4, wherein the zoom setting screen is displayed as a control ring in which a scale indicating a focal length corresponding to the first magnification of the digital zoom is displayed on an arc-shaped outer periphery of the control ring.

6. The non-transitory computer-readable medium according to claim 5, the operations further comprising displaying, on a monitor screen, an image with a second magnification corresponding to a first rotation amount of the control ring.

7. The non-transitory computer-readable medium according to claim 6, the operations further comprising:
detecting a pinch operation on the monitor screen;
displaying, based on the detection of the pinch operation on the monitor screen, an image with a third magnification corresponding to a pinch amount on the monitor screen; and
rotating the control ring by a second rotation amount corresponding to the third magnification.

8. The non-transitory computer-readable medium according to claim 1, wherein
the electronic device further includes:
a camera key on a side surface of the electronic device, and
a touch screen, and
the camera key performs a shutter operation, and
when one side of the touch screen of the electronic device facing the camera key is an upper side, the exposure control parameter setting screen is displayed in an operation area along a right side of the touch screen.

9. The non-transitory computer-readable medium according to claim 8, wherein the exposure control parameter setting screen is displayed in an area facing the upper side in the operation area.

10. The non-transitory computer-readable medium according to claim 9, the operations further comprising displaying a plurality of function menus in an area adjacent to the exposure control parameter setting screen in the operation area.

11. An information processing method, comprising:
in an electronic device including a plurality of built-in camera lenses having different focal lengths:
displaying a photographing mode selection screen to select a photographing mode, a lens selection screen to select a photographing camera lens for photographing from the plurality of built-in camera lenses, and an exposure control parameter setting screen to set an exposure control parameter,
wherein the photographing mode selection screen is displayed as a mode dial in which a symbol indicating the photographing mode is displayed on an arc-shaped outer periphery of the mode dial.

12. An electronic device, comprising:
a plurality of camera lenses having different focal lengths; and
a touch screen configured to display a photographing mode selection screen to select a photographing mode, a lens selection screen to select a photographing camera lens for a photographing operation from the plurality of camera lenses, and an exposure control parameter setting screen to set an exposure control parameter,
wherein the photographing mode selection screen is displayed as a mode dial in which a symbol indicating the photographing mode is displayed on an arc-shaped outer periphery of the mode dial.

13. A non-transitory computer-readable medium having stored thereon, computer-executable instructions which, when executed by an electronic device including a plurality of built-in camera lenses having different focal lengths, cause the electronic device to execute operations, the operations comprising:
displaying a photographing mode selection screen to select a photographing mode, a lens selection screen to select a photographing camera lens for photographing from the plurality of built-in camera lenses, and an exposure control parameter setting screen to set an exposure control parameter, wherein
the electronic device further includes a camera key on a side surface of the electronic device, and a touch screen, the camera key performs a shutter operation, and when one side of the touch screen of the electronic device facing the camera key is an upper side, the exposure control parameter setting screen is displayed in an operation area along a right side of the touch screen.

14. The non-transitory computer-readable medium according to claim 13, the operations further comprising:

displaying a photographing mode key indicating the photographing mode;

detecting a touch operation on the photographing mode key;

displaying the photographing mode selection screen based on the detection of the touch operation on the photographing mode key; and displaying, based on the selection of the photographing mode on the photographing mode selection screen, the exposure control parameter setting screen to set the exposure control parameter associated with the selected photographing mode.

15. The non-transitory computer-readable medium according to claim 13, the operations further comprising:

displaying a lens key indicating the photographing camera lens;

detecting a touch operation on the lens key; and displaying the lens selection screen based on the detection of the touch operation on the lens key.

16. The non-transitory computer-readable medium according to claim 13, the operations further comprising:

detecting a touch operation on an arrow key displayed on the lens selection screen; and displaying, based on the detection of the touch operation on the arrow key, a zoom setting screen to set a first magnification of digital zoom starting from an angle of view of the photographing camera lens.

17. The non-transitory computer-readable medium according to claim 16, wherein the zoom setting screen is displayed as a control ring in which a scale indicating a focal length corresponding to the first magnification of the digital zoom is displayed on an arc-shaped outer periphery of the control ring.

18. The non-transitory computer-readable medium according to claim 17, the operations further comprising displaying, on a monitor screen, an image with a second magnification corresponding to a rotation amount of the control ring.

19. The non-transitory computer-readable medium according to claim 13, wherein the exposure control parameter setting screen is displayed in an area facing the upper side in the operation area.

20. The non-transitory computer-readable medium according to claim 19, the operations further comprising displaying a plurality of function menus in an area adjacent to the exposure control parameter setting screen in the operation area.

* * * * *